(12) United States Patent
Ogawa et al.

(10) Patent No.: US 11,415,124 B2
(45) Date of Patent: Aug. 16, 2022

(54) APPARATUS AND METHOD FOR DETECTING OCCURRENCE OF CAVITATION

(71) Applicant: Yokogawa Electric Corporation, Tokyo (JP)

(72) Inventors: Hiromitsu Ogawa, Tokyo (JP); Soichiro Konada, Tokyo (JP); Norio Tanaka, Tokyo (JP); Takaaki Matsuda, Tokyo (JP)

(73) Assignee: Yokogawa Electric Corporation, Tokyo (JP)

( * ) Notice: Subject to any disclaimer, the term of this patent is extended or adjusted under 35 U.S.C. 154(b) by 228 days.

(21) Appl. No.: 16/703,952

(22) Filed: Dec. 5, 2019

(65) Prior Publication Data
US 2020/0182239 A1    Jun. 11, 2020

(30) Foreign Application Priority Data
Dec. 7, 2018    (JP) .............................. JP2018-229945

(51) Int. Cl.
  *F04B 51/00* (2006.01)
  *G01M 13/00* (2019.01)
(52) U.S. Cl.
  CPC ............. *F04B 51/00* (2013.01); *G01M 13/00* (2013.01)
(58) Field of Classification Search
  None
  See application file for complete search history.

(56) References Cited

U.S. PATENT DOCUMENTS

| | | | | |
|---|---|---|---|---|
| 5,772,403 A | * | 6/1998 | Allison | F04B 49/065 |
| | | | | 417/44.2 |
| 9,546,652 B2 | * | 1/2017 | Yin | F04B 49/00 |
| 2004/0117132 A1 | * | 6/2004 | Stephenson | F04B 51/00 |
| | | | | 702/35 |
| 2004/0167738 A1 | * | 8/2004 | Miller | F04B 51/00 |
| | | | | 702/114 |
| 2012/0204627 A1 | * | 8/2012 | Anderl | F04B 1/26 |
| | | | | 73/64.53 |
| 2014/0039805 A1 | * | 2/2014 | Sharpe, Jr. | F04B 49/065 |
| | | | | 702/24 |

(Continued)

FOREIGN PATENT DOCUMENTS

| | | | | |
|---|---|---|---|---|
| CN | 104321529 A | * | 1/2015 | ............ F04C 14/08 |
| CN | 106053041 A | * | 10/2016 | |

(Continued)

OTHER PUBLICATIONS

Zhaoli Yan, Jin Liu, Bin Chen, Xiaobin Cheng, Jun Yang, Fluid cavitation detection method with phase demodulation of ultrasonic signal, Applied Acoustics, vol. 87, 2015, pp. 198-204, https://doi.org/10.1016/j.apacoust.2014.07.007 (Year: 2015).*

(Continued)

*Primary Examiner* — Lina M Cordero
(74) *Attorney, Agent, or Firm* — Sughrue Mion, PLLC

(57) ABSTRACT

A detection apparatus includes a suction pressure acquirer configured to acquire suction pressure data indicating suction pressure of a pump, and a detector configured to detect occurrence of cavitation in the pump based on a variation coefficient of the suction pressure data during a detection target period.

14 Claims, 7 Drawing Sheets

(56) References Cited

U.S. PATENT DOCUMENTS

| | | | |
|---|---|---|---|
| 2017/0226998 A1* | 8/2017 | Zhang | F04B 47/00 |
| 2018/0058443 A1* | 3/2018 | Doy | F04B 51/00 |

FOREIGN PATENT DOCUMENTS

| | | | |
|---|---|---|---|
| JP | 2010-127417 A | | 6/2010 |
| JP | 2014-032671 A | | 2/2014 |
| JP | 2015-520819 A | | 7/2015 |
| KR | 960007708 Y1 | * | 9/1996 |
| WO | 2013/147761 A2 | | 10/2013 |
| WO | 2014/091953 A1 | | 6/2014 |

OTHER PUBLICATIONS

Kotb, A. and Abdulaziz, A. (2015) Investigating the Validity of Acoustic Spectrum as a Prediction Tool for Pump Cavitation. Energy and Power Engineering, 7, 575-583. doi: 10.4236/epe.2015.713054 (Year: 2015).*

Yongqi Liu, "Research on Pressure Pulsation Method in Cavitation Diagnosis of Variable Speed Centrifugal Pump", Chinese Master's Theses Full-text Database, Engineering Science and Technology II, No. 9, pp. 5-10, 41, Sep. 15, 2012 (18 pages total).

* cited by examiner

APPARATUS AND METHOD FOR DETECTING OCCURRENCE OF CAVITATION

BACKGROUND

Technical Fields

The present invention relates to a detection apparatus, a detection method, and a non-transitory computer readable storage medium.

Priority is claimed on Japanese Patent Application No. 2018-229945, filed on Dec. 7, 2018, the contents of which are incorporated herein by reference.

Related Art

In the related art, a pump can be used to transfer or pump liquid. Since the pump pressurizes liquid sucked from a suction port and discharges the liquid from a discharge port, the liquid may be vaporized inside the pump according to an operation state and cavitation may occur. When the cavitation occurs, for example, pump efficiency is degraded, noise or vibration is generated, and the inside of the pump is damaged. Since it is difficult to completely prevent the occurrence of the cavitation, a mechanism capable of detecting the occurrence of cavitation at an early stage becomes important.

Japanese Unexamined Patent Application Publication No. 2014-32671 discloses an example of a system of the related art that monitors pump cavitation. Specifically, Japanese Unexamined Patent Application Publication No. 2014-32671 discloses a technology for providing a pressure sensor on a discharge line of a pump, providing a vibration sensor on a pump casing, and determining a state of cavitation based on at least one of a detection result of the pressure sensor and a detection result of the vibration sensor.

Incidentally, when the technology disclosed in Japanese Unexamined Patent Application Publication No. 2014-32671 is used, it can be considered that it is possible to determine a state of the cavitation inside the pump. However, in the technology disclosed in Japanese Unexamined Patent Application Publication No. 2014-32671, since the pressure sensor that detects the pressure of the discharge line of the pump and the vibration sensor that detects vibration of the pump are necessary, there is a problem in that it is necessary for existing facilities to be changed and the sensors to be attached.

SUMMARY

A detection apparatus may include a suction pressure acquirer configured to acquire suction pressure data indicating suction pressure of a pump, and a detector configured to detect occurrence of cavitation in the pump based on a variation coefficient of the suction pressure data during a detection target period.

Further features and aspects of the present disclosure will become apparent from the following detailed description of exemplary embodiments with reference to the attached drawings.

DETAILED DESCRIPTION OF THE EMBODIMENTS

The embodiments of the present invention will be now described herein with reference to illustrative preferred embodiments. Those skilled in the art will recognize that many alternative preferred embodiments can be accomplished using the teaching of the present invention and that the present invention is not limited to the preferred embodiments illustrated herein for explanatory purposes.

An aspect of the present invention is to provide a detection apparatus, a detection method, and a non-transitory computer readable storage medium capable of detecting occurrence of cavitation with high accuracy and simplicity without changing existing facilities.

Hereinafter, a detection apparatus, a detection method, and a detection program according to an embodiment of the present invention will be described in detail with reference to the drawings. The following embodiments do not limit the present invention. Further, not all combinations of characteristics described in the following embodiments are essential for a solving means of the invention.

<Plant in which Detection Apparatus is Used>

Figure 1:
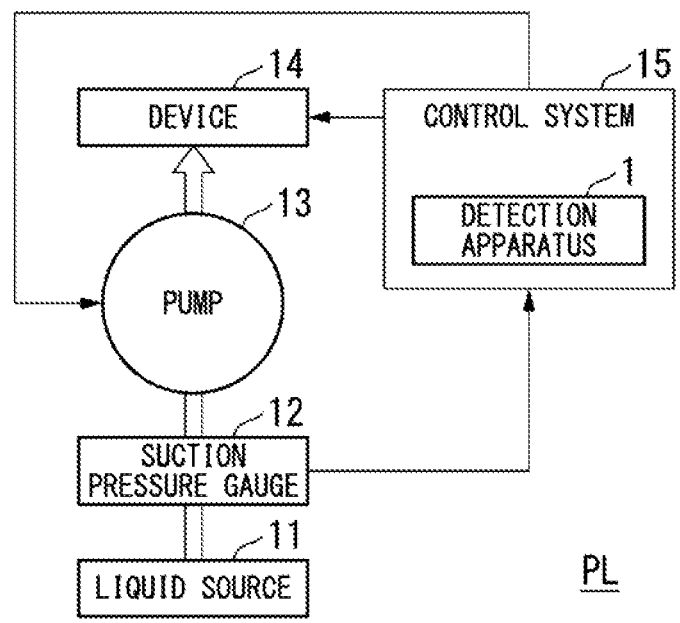
FIG. 1 is a block diagram illustrating an example of a plant in which a detection apparatus according to an embodiment of the present invention can be used.

FIG. 1 is a block diagram illustrating an example of a plant in which a detection apparatus according to an embodiment of the present invention can be used. As illustrated in FIG. 1, a liquid source 11, a suction pressure gauge 12, a pump 13, a device 14, and a control system 15 are provided in a plant PL. In such a plant PL, the pump 13 and the device 14 are controlled by the control system 15, and for example, a liquid of the liquid source 11 is supplied to the device 14 by the pump 13 and processed.

The plant PL may be, for example, an industrial plant such as a chemical plant, a plant that manages and controls wells such as in gas fields and oil fields, or in the vicinity thereof, a plant that manages and controls power generation such as hydropower generation, thermal power generation, and nuclear power generation, a plant that manages and controls energy harvesting such as solar power generation or wind power generation, or a plant that manages and controls water and sewage, dams, and the like. The plant PL may be at least one of a factory facility, a mechanical apparatus, a production apparatus, a power generation apparatus, or the like. Further, the plant PL may include a plurality of at least one of the liquid source 11, the suction pressure gauge 12, the pump 13, the device 14, or the control system 15.

The liquid source 11 stores or supplies the liquid, which is supplied to the device 14. The liquid source 11 may be, for example, a tank that preserves and stores the liquid, and maintains a pressure thereof. Further, the liquid source 11 may be, for example, a well or an oil well provided in a region in which resources such as groundwater and oil fields have been accumulated or buried. Further, the liquid source 11 may be a river, a pond, a lake, a dam, or the like. Further, the liquid source 11 may be a tank in which liquid to be supplied by another pump is stored. Further, the liquid source 11 may be a pipe connected to a tank or the like.

The suction pressure gauge 12 is provided between the liquid source 11 and the pump 13 and measures suction pressure of the pump 13. The suction pressure gauge 12 is, for example, an existing facility that is provided when the pump 13 is installed. The suction pressure gauge 12 is, for example, a differential pressure type flow meter or a pressure transmitter. The suction pressure gauge 12 may function as a sensor that detects an operation of the pump 13. The suction pressure gauge 12 may be provided for each pump 13. In FIG. 1, an example in which one liquid source 11, one suction pressure gauge 12, and one pump 13 are provided in the plant PL is shown. The suction pressure gauge 12 may be used for control of the plant PL.

The pump 13 supplies the liquid from the liquid source 11 to the device 14. The pump 13 is connected between the liquid source 11 and the device 14 using valves, pipes, or the like. In FIG. 1, an example of a moving direction of the liquid inside the pipe is indicated by an arrow from the liquid source 11 to the device 14. The pump 13 may be a centrifugal pump having a blade-shaped rotor (impeller) or the like. Further, the pump 13 may be a diffuser pump, a cascade pump, an axial flow pump, a mixed flow pump, a cross flow pump, or the like. A plurality of pumps 13 may be disposed in the plant PL.

The device 14 is a control target in the plant PL. The device 14 may be a field device installed at a site in the plant PL. The device 14 may be at least one of factory facility, mechanical apparatuses, production apparatuses, power generation apparatuses, storage apparatuses, or the like. The device 14 may include a device that receives a supply of liquid such as water, oil, fuel, refrigerant, or medicine and performs a processing operation in which the liquid is used. The device 14 may include a plurality of apparatuses.

The control system 15 controls some or all of the pump 13, the device 14, and the like based on measurement results of measurers such as sensors provided in the plant PL. Further, the control system 15 may control a valve provided in a pipe or the like provided in the plant. For example, the control system 15 controls operations of the pump 13, the device 14, and the valve based on measurement data obtained by measuring an operation of the device 14 and the measurement data such as pressure, a temperature, a flow rate, and a storage amount of fluid such as the liquid handled in the plant PL.

The control system 15 may be connected to the device 14 or the like via a wired or wireless communication device and disposed at a position spaced from the device 14 or the like.

The control system 15 may be constructed as an automatic operation system or a maintenance system such as a distributed control system (DCS) and a supervisory control and data acquisition (SCADA) system. In this case, the control system 15 may exchange control data and measurement data with each unit at a frequency of about several Hz to several kHz.

In the above plant PL, it is preferable for control, maintenance, management, and the like of the device 14 including the pump 13 to be able to be executed. For example, cavitation or the like may occur in the pump 13, which may cause noise or vibration and lead to deterioration or destruction of the pump 13. In the plant PL, it is preferable for the operation of the pump 13 to be able to be monitored and for control, maintenance, management, or the like to be able to be executed in order to curb the occurrence of such an unstable operation as much as possible.

The detection apparatus 1 is provided in such a plant PL, and detects cavitation in real time based on a variation coefficient of the suction pressure data indicating the suction pressure of the pump 13. The detection apparatus 1 is configured to be applicable to an existing plant PL or the like, and can detect cavitation by acquiring the suction pressure data and obtaining the variation coefficient. The detection apparatus 1 may be included in the control system 15. Further, the detection apparatus 1 may be included in a measurer such as a sensor provided in the plant PL. FIG. 1 illustrates an example in which the detection apparatus 1 is provided in the control system 15.

<Configuration of Detection Apparatus>

Figure 2:
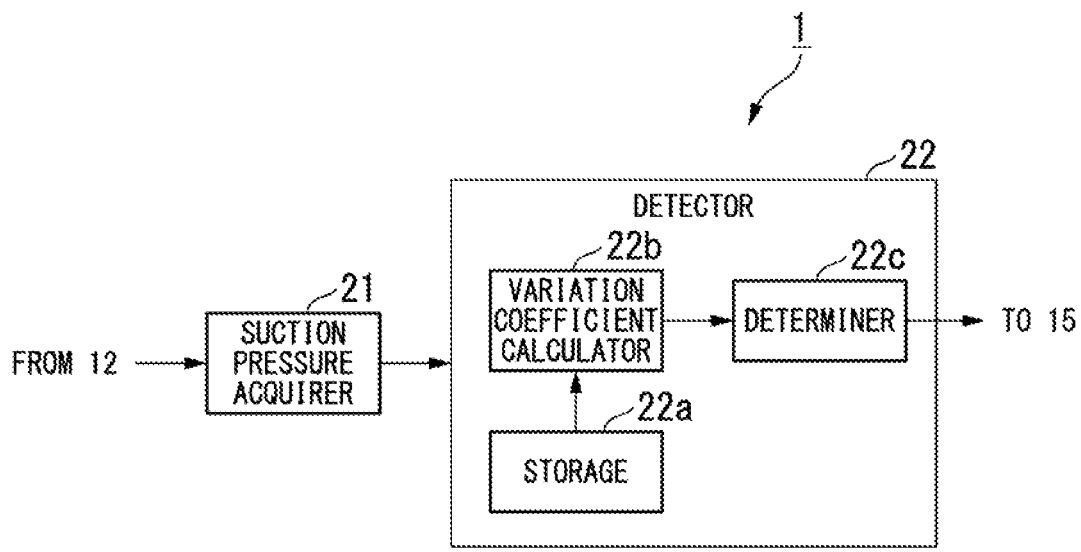
FIG. 2 is a block diagram illustrating a main configuration of the detection apparatus according to the embodiment of the present invention.

FIG. 2 is a block diagram illustrating a main configuration of the detection apparatus according to the embodiment of the present invention. As illustrated in FIG. 2, the detection apparatus 1 of the embodiment includes a suction pressure acquirer 21 and a detector 22. In addition, a connection form of the detection apparatus 1, the suction pressure gauge 12, and the control system 15 is arbitrary. For example, the detection apparatus 1 may be connected to the suction pressure gauge 12 and the control system 15 using wires or wirelessly. Alternatively, the detection apparatus 1 may be connected to the suction pressure gauge 12 and the control system 15 via a network or the like.

The suction pressure acquirer 21 acquires suction pressure data indicating the suction pressure of the pump 13. The suction pressure acquirer 21 may be connected to the suction pressure gauge 12 and receive the suction pressure data from the suction pressure gauge 12. Further, when the suction pressure data is stored in a database or the like (not shown), the suction pressure acquirer 21 may access the database or the like and acquire the suction pressure data. Further, the suction pressure acquirer 21 may acquire the suction pressure data from the control system 15. The suction pressure acquirer 21 supplies the acquired suction pressure data to the detector 22.

The detector 22 detects the occurrence of cavitation in the pump 13 based on the variation coefficient of the suction pressure data during the detection target period. Specifically, the detector 22 calculates the variation coefficient using the suction pressure data during the detection target period among the suction pressure data supplied from the suction pressure acquirer 21. The detector 22 compares the calculated variation coefficient with a predetermined threshold value (a reference variation coefficient), and detects whether cavitation has occurred in the pump 13 according to whether or not the variation coefficient exceeds the reference variation coefficient. The detector 22 includes a storage 22a, a variation coefficient calculator 22b, and a determiner 22c.

The storage 22a stores the suction pressure data supplied from the suction pressure acquirer 21. The storage 22a may be able to store data that is processed by the detection apparatus 1. For example, the storage 22a may store intermediate data, calculation results, parameters, and the like that are calculated (or used) in a process in which the detection apparatus 1 generates detection results. Further, the storage 22a may supply the stored data to a request source according to a request from each unit in the detection apparatus 1. The storage 22a, for example, supplies the stored suction pressure data to the variation coefficient calculator 22b in response to a request from the variation coefficient calculator 22b.

The variation coefficient calculator 22b calculates a variation coefficient of the suction pressure data during the detection target period. The variation coefficient calculator 22b calculates the variation coefficient based on an average value and a standard deviation of the suction pressure data during the detection target period. Specifically, the variation coefficient calculator 22b calculates the average value and the standard deviation of the suction pressure data during the detection target period, and calculates a value obtained by dividing the standard deviation by the average value, as the variation coefficient.

The variation coefficient calculator 22b may obtain a moving average value of the suction pressure data as the above average value, and obtain a moving standard deviation of the suction pressure data as the above standard deviation. Thereby, since it is possible to obtain the variation coefficient of suction pressure data sequentially while shifting the detection target period, it is possible to detect occurrence of cavitation in the pump 13 at an early stage. The variation coefficient calculator 22b supplies the calculated variation coefficient to the determiner 22c.

Here, the average value of the suction pressure data during the detection target period is set as $P_{adv}$, and the standard deviation of the suction pressure data during the detection target period is set as $S_p$. The variation coefficient calculator 22b calculates a variation coefficient $C_v$ of the suction pressure data during the detection target period using, for example, Equation (1) below.

[Equation 1]

$$C_v = \frac{S_p}{P_{adv}} \quad (1)$$

When the number of pieces of suction pressure data during the detection target period is n and a static pressure (suction pressure data) at a suction port of the pump 13 is $P_i$, a standard deviation $S_p$ of the suction pressure data during the detection target period can be calculated using Equation (2) below.

[Equation 2]

$$S_p = \sqrt{\frac{1}{n}\sum_{i=1}^{n}(P_i - P_{adv})^2} \quad (2)$$

The determiner 22c acquires the variation coefficient from the variation coefficient calculator 22b. The determiner 22c determines that cavitation has occurred in the pump 13 when the acquired variation coefficient has exceeded a predetermined reference variation coefficient. Here, the determiner 22c can use a variation coefficient of the suction pressure data acquired by the suction pressure acquirer 21 before the detection target period described above, or a coefficient obtained by performing a predetermined calculation (for example, multiplication by a predetermined constant) on the variation coefficient, as the reference variation coefficient.

For example, the determiner 22c can use a coefficient obtained by multiplying the variation coefficient of the suction pressure data obtained in a state in which a certain time (for example, about several tens of seconds to several minutes) has elapsed after an operation of a new pump 13 has started, and then the operation is stable, by a certain number, as the reference variation coefficient. The above "state in which the operation is stable" is, for example, a state in which the variation of the suction pressure data of the pump 13 is less than a certain value.

The determiner 22c may notify the control system 15 that cavitation has been detected. Further, the determiner 22c may also notify the control system 15 that cavitation has not been detected. The setting of the reference variation coefficient described above may be performed at a predetermined timing corresponding to a notification from the control system 15 according to an operating state of the pump 13 or the device 14, for example.

<Operation of the Detection Apparatus>

Next, an operation of the detection apparatus 1 according to an embodiment of the present invention will be described. The operation of the detection apparatus 1 is roughly divided into an operation for setting the reference variation coefficient (hereinafter referred to as an "initial setting operation") and an operation for detecting the occurrence of cavitation (hereinafter referred to as a "detection operation"). Hereinafter, the initial setting operation and the detection operation will be described in order.

<<Initial Setting Operation>>

Figure 3:
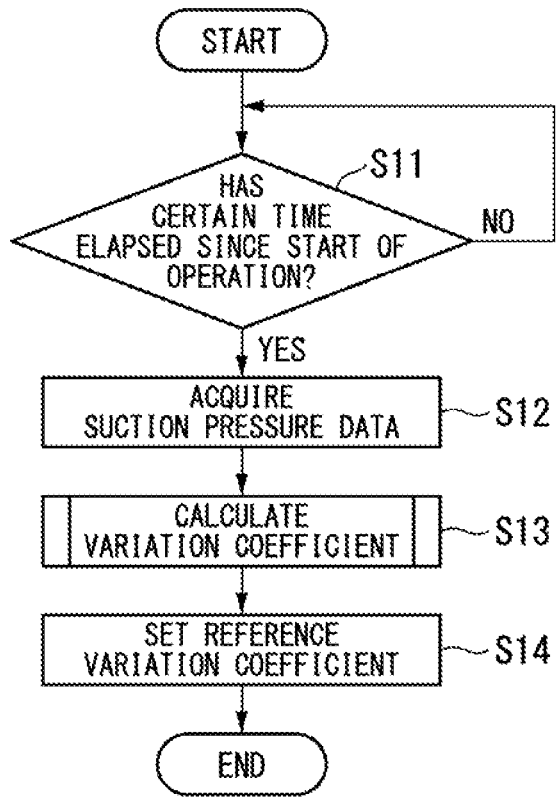
FIG. 3 is a flowchart showing an example of an initial setting operation of the detection apparatus according to the embodiment of the present invention.

FIG. 3 is a flowchart showing an example of the initial setting operation of the detection apparatus according to the embodiment of the present invention. A process of the flowchart illustrated in FIG. 3 is started, for example, when an operation start button of the pump 13 newly installed in the plant PL is pressed. When the operation of the pump 13 is started, the pressure at the suction port of the pump 13 changes suddenly. Therefore, the detection apparatus 1 can recognize the start of the operation of the pump 13 from the sudden change in the suction pressure data. When the operation of the pump 13 is started under the control of the control system 15, the control system 15 may notify the detection apparatus 1 of an operation start of the pump 13.

When the process is started, first, the detector 22 determines whether or not a certain time has elapsed since the start of the operation of the pump 13 (step S11). For example, it is determined whether or not about tens of seconds to several minutes have elapsed since the operation of the pump 13 has been started. Immediately after the operation of the pump 13 is started, the pump is in an unstable state in which it is easy for cavitation to occur, but when a certain time has elapsed since the operation of the pump 13 has been started, the pump is in a stable state in which no cavitation occurs. The process of step S11 is performed to determine whether or not such a stable state has been reached.

When it is determined that a certain time has not elapsed since the start of operation of the pump 13 (when the determination result of step S11 is "NO"), the process of step S11 is repeated. On the other hand, when it is determined that a certain time has elapsed since the start of operation of the pump 13 (when the determination result of step S11 is "YES"), the suction pressure acquirer 21 acquires the suction pressure data (step S12). The suction pressure data acquired by the suction pressure acquirer 21 is stored in the storage 22a of the detector 22, for example. The suction pressure acquirer 21 may acquire the suction pressure data each time the suction pressure gauge 12 samples the pressure data. Alternatively, the suction pressure acquirer 21 may acquire the suction pressure data collectively for each of predetermined sampling numbers.

Figure 4:
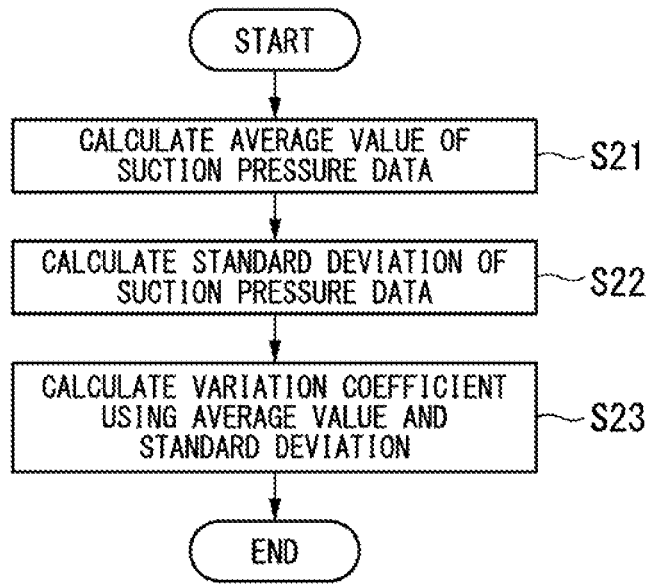
FIG. 4 is a flowchart showing a specific calculation process for a variation coefficient.

Then, the variation coefficient calculator 22b calculates the variation coefficient using the suction pressure data acquired in step S12 (step S13). FIG. 4 is a flowchart showing a specific calculation process of the variation coefficient. When the process is started, the variation coefficient calculator 22b calculates the average value $P_{adv}$ of the suction pressure data (step S21). For example, the variation coefficient calculator 22b adds together values of n pieces of suction pressure data in the detection target period and divides the value obtained by the addition by n to obtain the average value $P_{adv}$.

For example, when a current time is $t_0$, a period from time ($t_0$-T) to the current time ($t_0$) can be set as the detection target period. A length T of the detection target period can be arbitrarily set. The length T of the detection target period is set in consideration of, for example, properties of the liquid supplied from the liquid source 11 and accuracy of the cavitation detection. As an example, the length T of the detection target period is set to about several seconds.

Then, the variation coefficient calculator 22b calculates the standard deviation of the suction pressure data (step S22). For example, the variation coefficient calculator 22b obtains the standard deviation $S_p$ by putting the average value $P_{adv}$ calculated in step S21 and the suction pressure data $P_i$ into Equation (2) described above. Subsequently, the variation coefficient calculator 22b calculates the variation coefficient using the average value and the standard deviation (step S23). Specifically, the variation coefficient calculator 22b obtains the variation coefficient $C_v$ by putting the average value $P_{adv}$ calculated in step S21 and the standard deviation $S_p$ calculated in step S22 into Equation (1) described above.

When the above process is completed, the determiner 22c sets the reference variation coefficient (step S14). Specifically, the determiner 22c supplies, from the variation coefficient calculator 22b to the determiner 22c, a coefficient obtained by multiplying the variation coefficient $C_v$ obtained in step S13 (step S23) by a certain number. The supplied coefficient is set as the reference variation coefficient in the determiner 22c.

Here, an example is described in which the coefficient (coefficient obtained by multiplying the variation coefficient $C_v$ by a certain number) obtained by the variation coefficient calculator 22b is supplied to the determiner 22c and set as the reference variation coefficient. However, the coefficient obtained by the variation coefficient calculator 22b may be stored in the storage 22a, and the determiner 22c may read the coefficient stored in the storage 22a and set the coefficient as the reference variation coefficient. When the setting of the reference variation coefficient is completed, the initial setting operation ends.

<<Detection Operation>>

Figure 5:
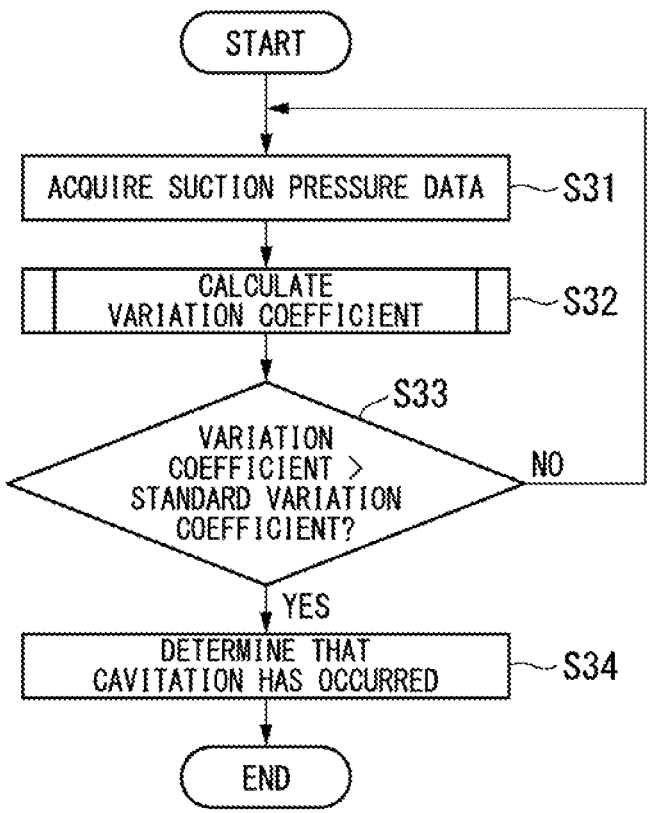
FIG. 5 is a flowchart showing an example of a detection operation of the detection apparatus according to the embodiment of the present invention.

FIG. 5 is a flowchart showing an example of the detection operation of the detection apparatus according to the embodiment of the present invention. A process of the flowchart illustrated in FIG. 5 is performed, for example, when the user instructs the detection apparatus 1 to start the detection operation after the initial setting operation described above is completed (after the process of setting the reference variation coefficient is completed).

When the process is started, first, the suction pressure acquirer 21 acquires the suction pressure data (step S31: Suction pressure acquisition step). The suction pressure data acquired by the suction pressure acquirer 21 is stored in the storage 22a of the detector 22, for example. The suction pressure acquirer 21 may acquire the suction pressure data each time the suction pressure gauge 12 samples the pressure data, as in the initial setting operation described above. Alternatively, the suction pressure acquirer 21 may acquire the suction pressure data collectively for each of predetermined sampling numbers.

Then, the variation coefficient calculator 22b calculates a variation coefficient using the suction pressure data acquired in step S31 (step S32). Specifically, the same process as that illustrated in FIG. 4 is performed. That is, the variation coefficient calculator 22b performs the process of calculating the average value of the suction pressure data in the detection target period (step S21), the process of calculating the standard deviation of the suction pressure data in the detection target period (step S22), and the process of calculating the variation coefficient using the average value and the standard deviation (step S23).

For example, when a current time is $t_1$, a period from time ($t_1$-T) to the current time ($t_1$) can be set as the detection target period. A length T of the detection target period can be arbitrarily set, as in the initial setting operation described above. Further, a moving average value may be calculated in the process of step S21, and a moving standard deviation may be calculated in the process of step S22.

When the above process is completed, the determiner 22c determines whether or not the variation coefficient calculated in step S32 is greater than the reference variation coefficient (step S33: Detection step). When it is determined that the variation coefficient calculated in step S32 is equal to or smaller than the reference variation coefficient (when the determination result in step S33 is "NO"), the processes of steps S31 to S33 are repeated. That is, it is determined that cavitation has not occurred in the pump 13, and the process of calculating the variation coefficient is performed while changing the detection target period (while setting a new detection target period).

For example, when a time when the processes of steps S31 to S33 are repeated once is $t_2$, the detection target period can be set to, for example, a period from time ($t_2$-T) to time $t_2$. When a time when the processes of steps S31 to S33 are repeated one more time is $t_3$, the detection target period can be set to, for example, a period from time ($t_3$-T) to time $t_3$. That is, when the current time becomes $t_m$ (m is an integer equal to or greater than 2) each time the processes of steps S31 to S33 are repeated, the detection target period can be set to, for example, a period from time ($t_m$-T) to the current time ($t_m$) each time the processes of steps S31 to S33 are repeated. The setting of the detection setting period is merely an example, and the detection setting period can be arbitrarily set.

On the other hand, when it is determined that the variation coefficient calculated in step S32 is greater than the reference variation coefficient (when the determination result in step S33 is "YES"), the determiner 22c determines that cavitation has occurred in the pump 13 (step S34: Detection step). When it is determined that the cavitation has occurred in the pump 13, for example, the determiner 22c notifies the control system 15 of that fact. After the above processes are performed, a series of processes in the flowchart illustrated in FIG. 5 ends.

<Measurement Results>

Figure 6:
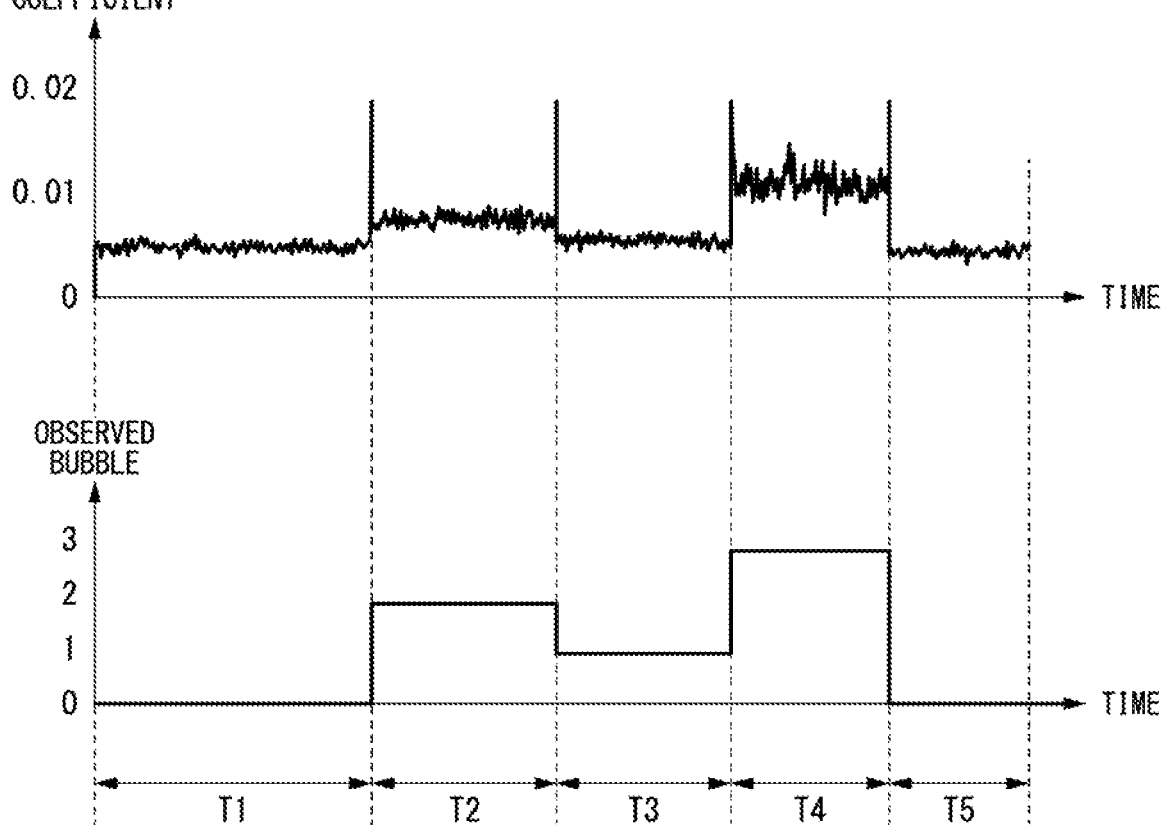
FIG. 6 is a diagram illustrating a relationship between a calculated variation coefficient and bubble observed in a pump in the embodiment of the present invention.

FIG. 6 is a diagram illustrating a relationship between the calculated variation coefficient and bubble observed in the pump in an embodiment of the present invention. In a graph illustrated on the upper side of FIG. 6, a horizontal axis indicates time and a vertical axis indicates the variation coefficient. In a graph illustrated on the lower side of FIG. 6, a horizontal axis indicates time and a vertical axis indicates the observed bubble (bubble level). The horizontal axes of both the graphs have substantially the same time scales. The variation coefficient has been calculated by the detector 22 (the variation coefficient calculator 22b), and the bubble level has been visually observed.

Referring to FIG. 6, it can be seen that, in periods T1 and T5, no bubble is visually observed, and the variation coefficient is small (approximately smaller than 0.005). On the other hand, it can be seen that, in periods T2 to T4, a bubble is visually observed (cavitation occurs), and levels of the bubble (an amount of bubble and a size of the bubble) increase in an order of in the periods T3, the period T2, and the period T4. It can also be seen that the variation coefficient increases in an order of the period T3, the period T2, and the period T4. That is, it can be seen from FIG. 6 that there is a correlation between the visually observed bubble and the variation coefficient. It can be seen from the results of FIG. 6 that the occurrence of the cavitation can be detected based on the variation coefficient, and in addition, a degree of cavitation can be determined.

Figure 7A:
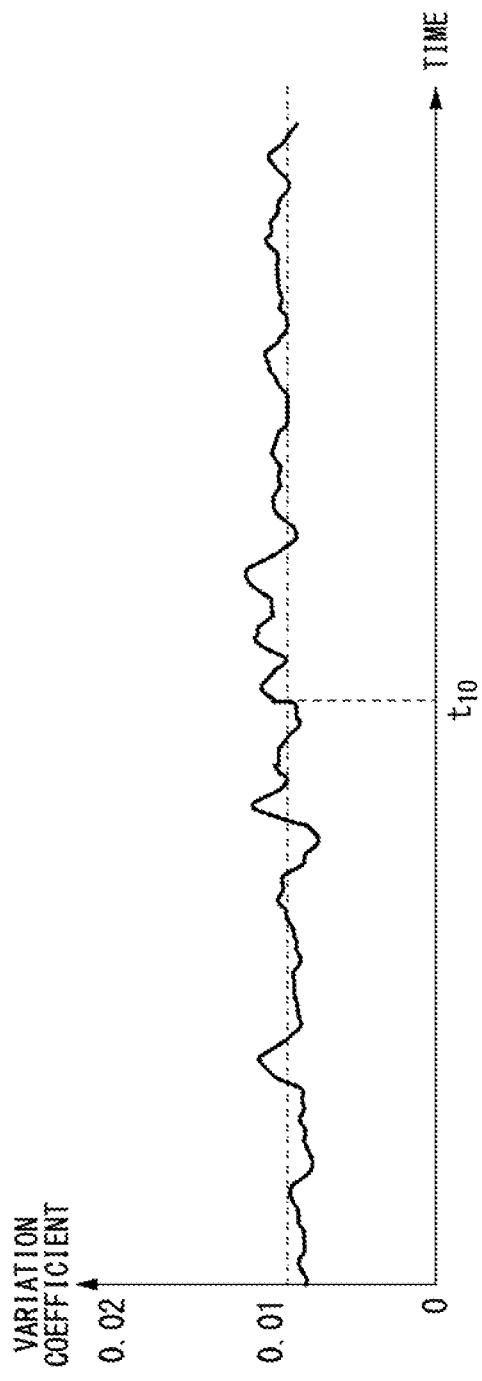
FIG. 7A is a diagram illustrating an example of a variation coefficient of suction pressure data in the embodiment of the present invention.
Figure 7B:
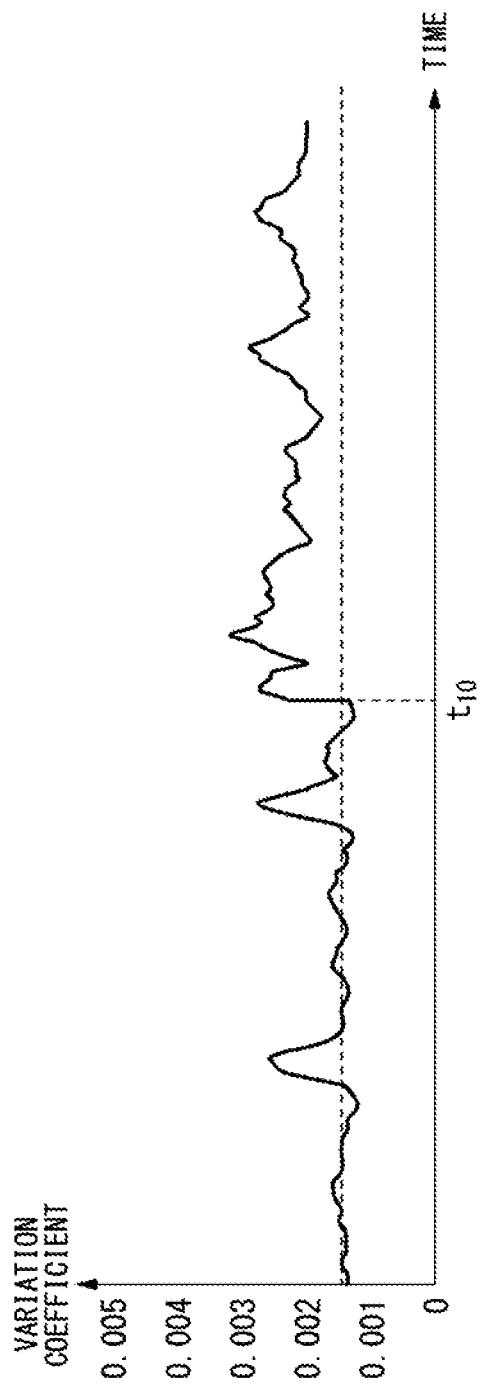
FIG. 7B is a diagram illustrating an example of a variation coefficient of discharge pressure data in the embodiment of the present invention.

FIGS. 7A and 7B are diagrams illustrating an example of the variation coefficient of the suction pressure data and a variation coefficient of discharge pressure data in the embodiment of the present invention. The suction pressure data is data indicating suction pressure of the pump 13, and the discharge pressure data is data indicating discharge pressure of the pump 13. The discharge pressure data is data that is measured by a discharge pressure gauge (not illustrated) that is provided between the pump 13 and the device 14 and measures the discharge pressure of the pump 13.

A graph illustrated in FIG. 7A is a graph showing a moving average of a variation coefficient of the suction pressure data. On the other hand, a graph illustrated in FIG. 7B is a graph showing a moving average of a variation coefficient of the discharge pressure data. In the graphs illustrated in FIGS. 7A and 7B, a horizontal axis indicates time and a vertical axis indicates the variation coefficient (the moving average). The horizontal axes of the graphs illustrated in FIGS. 7A and 7B have substantially the same time scales.

In the graphs illustrated in FIGS. 7A and 7B, a flow rate of the liquid supplied from the liquid source 11 to the pump 13 changes suddenly at time $t_{10}$. Referring to FIG. 7A, it can be seen that the moving average of the variation coefficient of the suction pressure data does not change greatly and is substantially constant before and after time $t_{10}$ when the flow rate of the liquid changes suddenly. On the other hand, referring to FIG. 7B, it can be seen that the moving average of the variation coefficient of the discharge pressure data increases after time $t_{10}$ when the flow rate of the liquid has changed suddenly as compared to before time $t_{10}$.

That is, the variation coefficient of the suction pressure data is substantially constant regardless of the flow rate of the liquid supplied from the liquid source 11 to the pump 13, but the variation coefficient of the discharge pressure data varies according to the flow rate of the liquid supplied from the liquid source 11 to the pump 13. Therefore, when the variation coefficient of the discharge pressure data has been used, it is necessary to change a reference variation coefficient (the threshold value) according to the flow rate of the liquid supplied from the liquid source 11 to the pump 13. On the other hand, when the variation coefficient of the suction pressure data has been used, it is not necessary to change the reference variation coefficient (the threshold value) regardless of the flow rate of the liquid supplied from the liquid source 11 to the pump 13. Therefore, it is possible to detect the occurrence of the cavitation with high accuracy and simplicity by using the variation coefficient of the suction pressure data.

As described above, in the embodiment, the suction pressure acquirer 21 provided in the detection apparatus 1 acquires the suction pressure data indicating the suction pressure of the pump 13 from the suction pressure gauge 12, which is the existing facility, and the detector 22 provided in the detection apparatus 1 detects the occurrence of the cavitation in the pump 13 based on the variation coefficient of the suction pressure data during the detection target period. Therefore, it is possible to detect the occurrence of the cavitation with high accuracy and simplicity without changing existing facilities.

The occurrence of the cavitation can also be detected using the standard deviation of the suction pressure data. However, since the standard deviation of the suction pressure data varies according to the flow rate of the liquid supplied from the liquid source 11 to the pump 13, it is necessary to change the reference variation coefficient (the threshold value) according to the flow rate of the liquid supplied from the liquid source 11 to the pump 13, as in the case described with reference to FIG. 7B. It is not necessary to change the reference variation coefficient (the threshold value) regardless of the flow rate of the liquid supplied from the liquid source 11 to the pump 13, by using the variation coefficient of the suction pressure data (a coefficient obtained by dividing the standard deviation of the suction pressure data by the average value of the suction pressure data) as in the embodiment. Therefore, it is possible to detect the occurrence of the cavitation with high accuracy and simplicity.

Modification Examples

Figure 8:
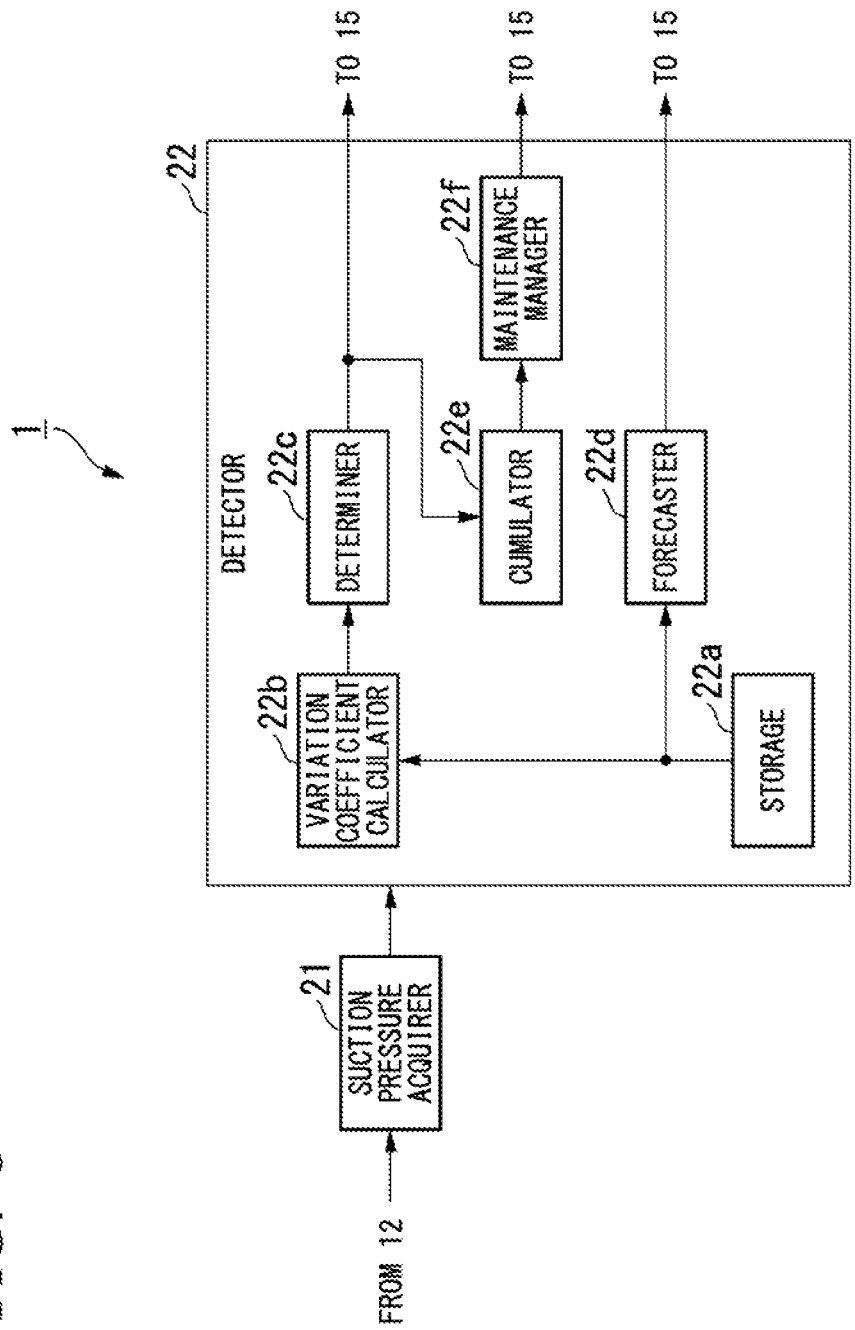
FIG. 8 is a block diagram illustrating a modification example of the detection apparatus according to the embodiment of the present invention.

FIG. 8 is a block diagram illustrating a modification example of the detection apparatus according to the embodiment of the present invention. In FIG. 8, the same components as those illustrated in FIG. 2 are denoted by the same reference numerals. As illustrated in FIG. 8, a detection apparatus 1 according to the modification example has a configuration in which a forecaster 22d, a cumulator 22e, and a maintenance manager 22f are added to the detector 22 illustrated in FIG. 2.

The forecaster 22d forecasts the occurrence of the cavitation in the pump 13 when the value of the suction pressure data becomes equal to or smaller than a predetermined threshold value. For example, the forecaster 22d forecasts the occurrence of the cavitation when the value of the suction pressure data becomes smaller than a pressure data value (threshold value) corresponding to atmospheric pressure. That is, the forecaster 22d forecasts the occurrence of the cavitation when the value of the suction pressure data has changed from a value indicating positive pressure to a value indicating negative pressure. The control system 15, for example, is notified of the occurrence of the cavitation forecasted by the forecaster 22d.

Figure 9:
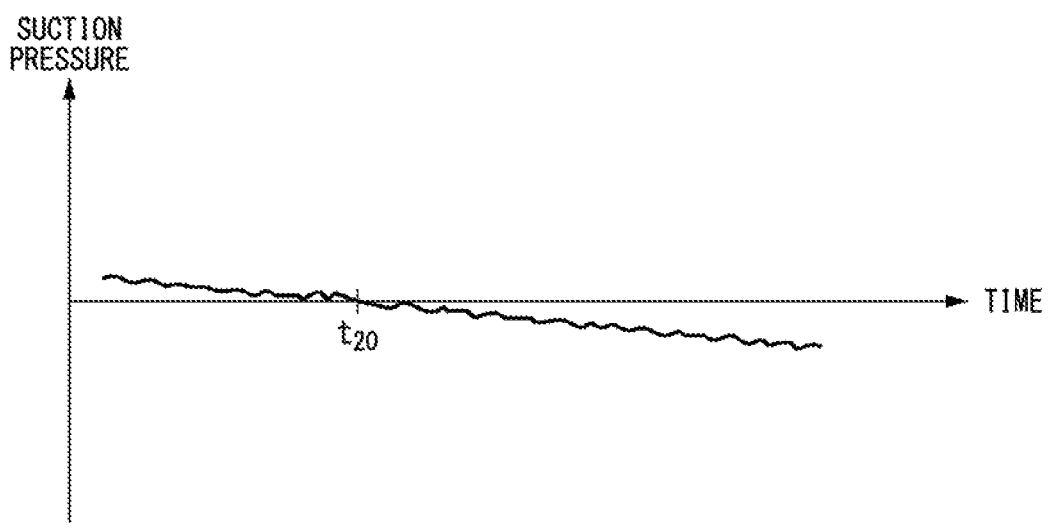
FIG. 9 is a diagram illustrating an example of suction pressure data that is acquired by the detection apparatus according to the embodiment of the present invention.

FIG. 9 is a diagram illustrating an example of the suction pressure data acquired by the detection apparatus according to the embodiment of the present invention. In a graph illustrated in FIG. 9, a horizontal axis indicates time, and a vertical axis indicates the suction pressure. The graph illustrated in FIG. 9 is an example of a measurement result of the suction pressure gauge 12. As illustrated in FIG. 9, the value of the suction pressure data may become pressure (negative pressure) lower than atmospheric pressure according to the operation of the pump 13. In the example illustrated in FIG. 9, the value of the suction pressure data gradually decreases to pressure lower than the atmospheric pressure after time $t_{20}$.

Thus, when the suction pressure becomes lower than the atmospheric pressure, pressure of the liquid supplied from the pump 13 to the device 14 becomes equal to or lower than saturated vapor pressure. Then, cavitation may occur due to vaporization of the liquid supplied from the pump 13 to the device 14. Therefore, the forecaster 22d can forecast future occurrence of cavitation according to whether or not the value of the suction pressure data has changed to negative pressure.

By the control system 15 being notified of the forecast of the forecaster 22d, the control system 15 can execute control for preventing the occurrence of the cavitation, preparation for control for cavitation, and the like in advance before the occurrence of the cavitation. It is possible to reduce the occurrence of the cavitation by performing such control or the like, and it is possible to rapidly cope with the cavitation even when the cavitation occurs.

The threshold value to be used by the forecaster 22d is not limited to a pressure data value corresponding to the atmospheric pressure (a value for detecting a change from positive pressure to negative pressure). Whether or not the suction pressure data tends to cause the cavitation depends on a type, characteristics, an individual difference of the pump 13, a design of the control system 15, or the like. Therefore, the threshold value to be used by the forecaster 22d may be determined according to the type, characteristics, and the like of the pump 13.

The cumulator 22e calculates a cumulative value obtained by cumulating time when the occurrence of the cavitation has been detected. Specifically, the cumulator 22e calculates the cumulative value based on a determination result of the determiner 22c. The cumulator 22e may calculate a cumulative value obtained by cumulating the number of times of the occurrence of the cavitation has been detected, instead of the time when the occurrence of the cavitation has been detected. The cumulator 22e may store the calculated cumulative value in the storage 22a.

The maintenance manager 22f determines at least one of a maintenance time or a replacement time of the pump 13 based on the cumulative value calculated by the cumulator 22e. Since the cavitation occurring in the pump 13 damages the pump 13, it is conceivable that the cavitation may affect life of the pump 13. Since the cumulative value calculated by the cumulator 22e is a value obtained by cumulating the time (number of times) when the occurrence of the cavitation has been detected, the cumulative value can be used as an index of the damage to the pump 13. Therefore, it is possible to determine an inspection timing and a replacement timing of the pump 13 by obtaining a cumulative value obtained by cumulating a time (the number of times) when the occurrence of the cavitation has been detected.

The maintenance manager 22f determines the inspection timing and the replacement timing of the pump 13, for example, by comparing the cumulative value calculated by the cumulator 22e with a predetermined threshold value. For example, when the cumulative value is equal to or greater than the threshold value, the maintenance manager 22f may notify the control system 15 of at least one of the inspection timing or the replacement timing. A threshold value for determining the inspection timing and a threshold value for determining the replacement timing may be set separately in the maintenance manager 22f. The threshold value set in the maintenance manager 22f may be determined based on data such as actual failure of the pump 13 and a lifetime thereof.

As described above, with the detection apparatus 1 according to the modification example, it is possible to realize forecasting of the cavitation, and maintenance and management of the pump 13, in addition to the detection of the cavitation. The detection apparatus 1 may perform only the forecasting of the cavitation, and may perform only the maintenance and management of the pump 13.

<Example of Implementation>

Figure 10:
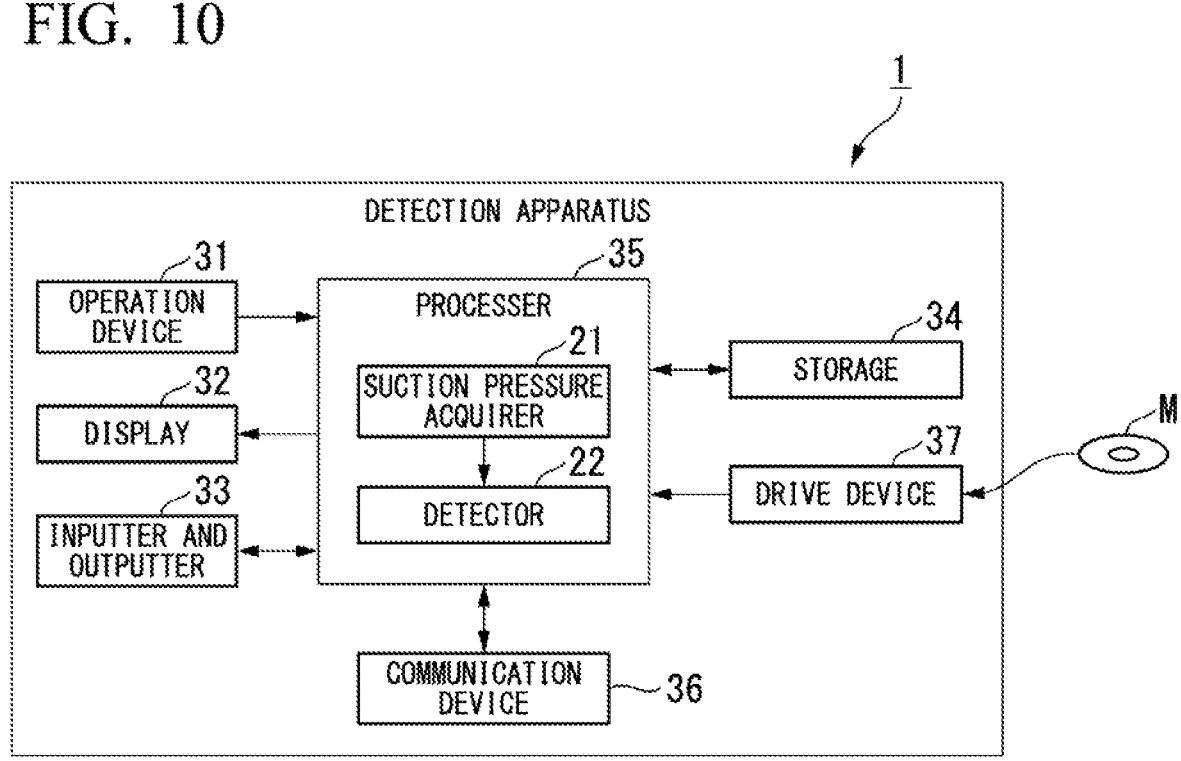
FIG. 10 is a block diagram illustrating an example of implementation of the detection apparatus according to the embodiment of the present invention.

FIG. 10 is a block diagram illustrating an example of implementation of the detection apparatus according to an embodiment of the present invention. As illustrated in FIG. 10, the detection apparatus 1 includes an operation device 31, a display 32, an inputter and outputter 33, a storage 34, a processor 35, a communication device 36, and a drive device 37. Such a detection apparatus 1 is realized by, for example, a desktop, notebook, or tablet computer. Although will be described below in detail, functions of the detection apparatus 1 (for example, a function of detecting the cavitation in the pump 13) are realized in software by a program recorded on a recording medium M being read and installed. Alternatively, the functions are realized in software by a program downloaded via a network (not illustrated) being installed.

The operation device 31 includes, for example, an input apparatus such as a keyboard and a pointing device, and outputs an instruction (an instruction with respect to the detection apparatus 1) according to an operation of a user who uses the detection apparatus 1 to the processor 35. The display 32 includes, for example, a display apparatus such as a liquid crystal display apparatus, and displays various types of information output from the processor 35. The operation device 31 and the display 32 may be physically separated, and may be physically integrated, like a touch panel type liquid crystal display apparatus having both a display function and an operation function.

The inputter and outputter 33 inputs or outputs various types of information under the control of the processor 35. For example, the inputter and outputter 33 may communicate with an external device (for example, the suction pressure gauge 12 illustrated in FIG. 1) to input or output various types of information, and may read or write various types of information from or to a removable recording medium (for example, a non-volatile memory) to input or output various types of information. The communication performed with the external device may be either wired communication or wireless communication.

The storage 34 includes, for example, an auxiliary storage apparatus such as a hard disk drive (HDD) or a solid state drive (SSD), and stores various types of information. For example, the storage 34 may store the suction pressure data acquired from the suction pressure gauge 12. That is, functions of the storage 22a illustrated in FIGS. 2 and 8 may be realized by the storage 34. Further, the storage 34 may store, for example, various programs to be executed by the detection apparatus 1.

The processor 35 performs various processes based on an instruction from the operation device 31. The processor 35 outputs results of various processes to the display 32, the inputter and outputter 33, or the communication device 36, or stores the results in the storage 34. Functions of the suction pressure acquirer 21 and the detector 22, which are main components of the detection apparatus 1, are provided in the processor 35. The functions to be provided in the processor 35 are realized by a program for realizing the functions being executed by hardware such as a central processing unit (CPU). That is, the functions of the suction pressure acquirer 21 and the detector 22 are realized by software and hardware resources in cooperation.

The communication device 36 performs communication via, for example, a network (not illustrated) under the control of the processor 35. The communication device 36 may perform wired communication or may perform wireless communication. The drive device 37 reads data recorded on a computer-readable recording medium M such as a CD-ROM or a DVD (registered trademark)-ROM. This recording medium M stores a program for realizing a function of each block of the detection apparatus 1 (for example, functions of the suction pressure acquirer 21 and the detector 22).

The example of implementation illustrated in FIG. 10 is merely an example, and it is to be noted that the implementation of the detection apparatus 1 is not limited to that illustrated in FIG. 10. Further, a program for realizing the function of each block of the detection apparatus 1 (for example, the function of the suction pressure acquirer 21 and the detector 22) does not necessarily have to be distributed in a state in which the program has been stored in the recording medium M. This program may be distributed via a network such as the Internet.

The detection apparatus, the detection method, and the detection program according to the embodiment of the present invention have been described above, but the present invention is not limited to the above-described embodiment, and can be freely changed within the scope of the present invention. For example, the example in which the detection apparatus 1 acquires the suction pressure data from the suction pressure gauge 12 has been described in the above embodiment. However, the detection apparatus 1 may acquire, for example, failure information from the suction pressure gauge 12, in addition to the suction pressure data.

When the suction pressure gauge 12, for example, fails, it is difficult to accurately detect the occurrence of the cavitation. Therefore, when the detection apparatus 1 has acquired the failure information of the suction pressure gauge 12, the detection apparatus 1 may not execute the detection of the cavitation. Further, the detection apparatus 1 may add, for example, the failure information acquired from the suction pressure gauge 12 to the detection results of the cavitation and notify the control system 15 of the failure information.

Further, in the above embodiment, the example in which the detection apparatus 1 is provided in the plant PL has been described. The plant PL is an example of a system in which the pump 13 that transfers liquid has been used, and the system in which the detection apparatus 1 is provided is not limited to the plant PL. Since cavitation may occur in the pump 13 that transfers the liquid, the detection apparatus 1 may be provided to detect the cavitation in, for example, a system, an apparatus, a device, or a use site in which the pump 13 is used.

<Supplementary Note>

A detection apparatus (1) according to an aspect of the present invention includes a suction pressure acquirer (21) configured to acquire suction pressure data indicating suction pressure of a pump (13), and a detector (22) configured to detect occurrence of cavitation in the pump based on a variation coefficient of the suction pressure data during a detection target period.

Further, in the detection apparatus according to the aspect of the present invention, the detector includes a variation coefficient calculator (22b) configured to calculate the variation coefficient of the suction pressure data during the detection target period, and a determiner (22c) configured to determine that the cavitation has occurred in the pump when the variation coefficient calculated by variation coefficient calculator exceeds a predetermined reference variation coefficient.

Further, in the detection apparatus according to the aspect of the present invention, the variation coefficient calculator calculates the variation coefficient based on an average value and a standard deviation of the suction pressure data during the detection target period.

Further, in the detection apparatus according to the aspect of the present invention, the variation coefficient calculator calculates a value obtained by dividing the standard deviation by the average value as the variation coefficient.

Further, in the detection apparatus according to the aspect of the present invention, the variation coefficient calculator obtains a moving average value of the suction pressure data as the average value, and the variation coefficient calculator obtains a moving standard deviation of the suction pressure data as the standard deviation.

Further, in the detection apparatus according to the aspect of the present invention, the determiner uses the variation coefficient of the suction pressure data acquired by the suction pressure acquirer before the detection target period or a coefficient obtained by performing a predetermined calculation on the variation coefficient, as the reference variation coefficient.

Further, the detection apparatus according to the aspect of the present invention includes a forecaster (22d) configured to forecast occurrence of the cavitation in the pump when the suction pressure data has changed from a value indicating positive pressure to a value indicating negative pressure.

Further, the detection apparatus according to the aspect of the present invention includes a cumulator (22e) configured to calculate a cumulative value by cumulating times when the occurrence of the cavitation has been detected or the number of times the occurrence of the cavitation has been detected, and a maintenance manager (22f) configured to determine at least one of a maintenance time or a replacement time of the pump based on the cumulative value.

Further, in the detection apparatus according to the aspect of the present invention, the detector determines whether or not a certain time has elapsed since a start of an operation of the pump, and when the detector has determined that the certain time has elapsed since the start of operation of the pump, the suction pressure acquirer acquires the suction pressure data, and the variation coefficient calculator calculates the variation coefficient using the suction pressure data acquired by the suction pressure acquirer.

Further, the detection apparatus according to the aspect of the present invention further includes a hardware-processor configured to execute a program to implement the suction pressure acquirer and the detector.

A detection method according to an aspect of the present invention, which is performed by a detection apparatus (1), includes acquiring suction pressure data indicating suction pressure of a pump (13), and detecting occurrence of cavitation in the pump based on a variation coefficient of the suction pressure data during a detection target period.

Further, the detection method according to the aspect of the present invention further includes calculating the variation coefficient of the suction pressure data during the detection target period, and determining that the cavitation has occurred in the pump when the calculated variation coefficient exceeds a predetermined reference variation coefficient.

Further, the detection method according to the aspect of the present invention further includes calculating the variation coefficient based on an average value and a standard deviation of the suction pressure data during the detection target period.

Further, the detection method according to the aspect of the present invention further includes calculating a value obtained by dividing the standard deviation by the average value as the variation coefficient.

Further, the detection method according to the aspect of the present invention further includes obtaining a moving average value of the suction pressure data as the average value, and obtaining a moving standard deviation of the suction pressure data as the standard deviation.

Further, the detection method according to the aspect of the present invention further includes using the variation coefficient of the suction pressure data acquired before the detection target period or a coefficient obtained by performing a predetermined calculation on the variation coefficient, as the reference variation coefficient.

Further, the detection method according to the aspect of the present invention further includes forecasting occurrence of the cavitation in the pump when the suction pressure data has changed from a value indicating positive pressure to a value indicating negative pressure.

Further, the detection method according to the aspect of the present invention further includes calculating a cumulative value by cumulating times when the occurrence of the cavitation has been detected or the number of times the occurrence of the cavitation has been detected, and determining at least one of a maintenance time or a replacement time of the pump based on the cumulative value.

Further, the detection method according to the aspect of the present invention further includes determining whether or not a certain time has elapsed since a start of an operation of the pump, and when the detection apparatus has determined that the certain time has elapsed since the start of operation of the pump, acquiring the suction pressure data, and calculating the variation coefficient using the suction pressure data.

A non-transitory computer readable storage medium storing one or more detection programs configured for execution by a computer, the one or more programs includes instructions for acquiring suction pressure data indicating suction pressure of a pump, and detecting occurrence of cavitation in the pump based on a variation coefficient of the suction pressure data during a detection target period.

As used herein, the following directional terms "front, back, above, downward, right, left, vertical, horizontal, below, transverse, row and column" as well as any other similar directional terms refer to those instructions of a device equipped with the present invention. Accordingly, these terms, as utilized to describe the present invention should be interpreted relative to a device equipped with the present invention.

The term "configured" is used to describe a component, unit or part of a device includes hardware and/or software that is constructed and/or programmed to carry out the desired function.

Moreover, terms that are expressed as "means-plus function" in the claims should include any structure that can be utilized to carry out the function of that part of the present invention.

The term "unit" is used to describe a component, unit or part of a hardware and/or software that is constructed and/or programmed to carry out the desired function. Typical examples of the hardware may include, but are not limited to, a device and a circuit.

While preferred embodiments of the present invention have been described and illustrated above, it should be understood that these are examples of the present invention and are not to be considered as limiting. Additions, omissions, substitutions, and other modifications can be made without departing from the scope of the present invention. Accordingly, the present invention is not to be considered as being limited by the foregoing description, and is only limited by the scope of the claims.

What is claimed is:

1. A detection apparatus comprising:
a suction pressure acquirer configured to acquire suction pressure data indicating suction pressure of a pump; and
a detector configured to detect an occurrence of a cavitation in the pump based on a variation coefficient of the suction pressure data during a detection target period,
wherein the detector comprises:
a variation coefficient calculator configured to calculate the variation coefficient based on an average value and a standard deviation of the suction pressure data during the detection target period; and
a determiner configured to determine that the cavitation has occurred in the pump when the variation coefficient calculated by the variation coefficient calculator exceeds a reference variation coefficient in the detection target period, and
wherein the variation coefficient calculator calculates a value obtained by dividing the standard deviation by the average value as the variation coefficient.

2. The detection apparatus according to claim 1,
wherein the variation coefficient calculator obtains a moving average value of the suction pressure data as the average value, and
wherein the variation coefficient calculator obtains a moving standard deviation of the suction pressure data as the standard deviation.

3. The detection apparatus according to claim 1,
wherein the determiner uses the variation coefficient of the suction pressure data acquired by the suction pressure acquirer before the detection target period or a coefficient obtained by performing a predetermined calculation on the variation coefficient, as the reference variation coefficient.

4. The detection apparatus according to claim 1, further comprising:
a forecaster configured to forecast the occurrence of the cavitation in the pump when the suction pressure data has changed from a value indicating positive pressure to a value indicating negative pressure.

5. The detection apparatus according to claim 1, further comprising:
a cumulator configured to calculate a cumulative value by cumulating times when the occurrence of the cavitation has been detected or a number of times the occurrence of the cavitation has been detected; and a maintenance manager configured to determine at least one of a maintenance time or a replacement time of the pump based on the cumulative value.

6. The detection apparatus according to claim 1,
wherein the detector determines whether or not a certain time has elapsed since a start of an operation of the pump, and
wherein when the detector has determined that the certain time has elapsed since the start of the operation of the pump, the suction pressure acquirer acquires the suction pressure data, and the variation coefficient calculator calculates the variation coefficient using the suction pressure data acquired by the suction pressure acquirer.

7. The detection apparatus according to claim 1, further comprising:
a hardware-processor configured to execute a program to implement the suction pressure acquirer and the detector.

8. A detection method performed by a detection apparatus, the detection method comprising:
acquiring suction pressure data indicating suction pressure of a pump;
calculating a variation coefficient based on an average value and a standard deviation of the suction pressure data during a detection target period; and
determining that cavitation has occurred in the pump when the variation coefficient exceeds a reference variation coefficient during the detection target period; and
calculating a value obtained by dividing the standard deviation by the average value as the variation coefficient.

9. The detection method according to claim 8, further comprising:
obtaining a moving average value of the suction pressure data as the average value; and
obtaining a moving standard deviation of the suction pressure data as the standard deviation.

10. The detection method according to claim 8, further comprising:
using the variation coefficient of the suction pressure data acquired before the detection target period or a coefficient obtained by performing a predetermined calculation on the variation coefficient, as the reference variation coefficient.

11. The detection method according to claim 8, further comprising:
forecasting occurrence of the cavitation in the pump when the suction pressure data has changed from a value indicating positive pressure to a value indicating negative pressure.

12. The detection method according to claim 8, further comprising:
calculating a cumulative value by cumulating times when an occurrence of the cavitation has been detected or a number of times the occurrence of the cavitation has been detected; and
determining at least one of a maintenance time or a replacement time of the pump based on the cumulative value.

13. The detection method according to claim 8, further comprising:
determining whether or not a certain time has elapsed since a start of an operation of the pump; and
when the detection apparatus has determined that the certain time has elapsed since the start of the operation of the pump, acquiring the suction pressure data, and calculating the variation coefficient using the suction pressure data.

14. A non-transitory computer readable storage medium storing one or more programs which, when accessed and executed by a computer, cause the computer to at least:
acquire suction pressure data indicating suction pressure of a pump;
calculate a variation coefficient based on an average value and a standard deviation of the suction pressure data during a detection target period;
determine that cavitation has occurred in the pump when the variation coefficient exceeds a predetermined reference variation coefficient in the detection target period; and
calculate a value obtained by dividing the standard deviation by the average value as the variation coefficient.

* * * * *